United States Patent [19]

Lapidot

[11] 3,855,124

[45] Dec. 17, 1974

[54] PROCESS AND APPARATUS FOR THE PURIFICATION OF AN AQUEOUS WASTE STREAM FROM A SILICONE-POLYMER PRODUCING PLANT

[75] Inventor: Heine Lapidot, Latham, N.Y.

[73] Assignee: General Electric Company, New York, N.Y.

[22] Filed: Nov. 22, 1971

[21] Appl. No.: 200,704

[52] U.S. Cl............ 210/44, 210/63, 210/71, 210/180, 210/199, 210/202
[51] Int. Cl............ B01d 21/10, C02c 1/28
[58] Field of Search............ 210/44, 59, 63, 70, 71, 210/83, 180, 199, 200, 201, 202, 205, 221, 257, 259, 42, 51, 52, 54

[56] References Cited
UNITED STATES PATENTS

| | | | |
|---|---|---|---|
| 3,023,162 | 2/1962 | Fordyce et al.............. | 210/52 X |
| 3,215,626 | 11/1965 | Console.................. | 210/63 X |
| 3,516,932 | 6/1970 | Hedrick et al............ | 210/51 X |
| 3,617,582 | 11/1971 | Lawes et al.............. | 210/63 |
| 3,660,277 | 5/1972 | McWhirter et al........ | 210/63 X |
| 3,617,539 | 11/1971 | Grutsch et al........... | 210/221 X |
| 3,677,405 | 7/1972 | Keith, Jr................ | 210/71 |
| 3,015,621 | 1/1962 | Quast................... | 210/205 |

FOREIGN PATENTS OR APPLICATIONS 2,026,622 10/1970 Germany............ 210/63

Primary Examiner—Samih N. Zaharna
Assistant Examiner—Robert H. Spitzer
Attorney, Agent, or Firm—Donald J. Voss, Esq.; George B. Finnegan, Jr.; Rocco S. Barrese

[57] ABSTRACT

A process for the purification of an aqueous waste stream from a silicone-polymer producing plant which includes conducting the aqueous waste stream to a flotation and sedimentation zone; adjusting the pH of the waste water stream to at least about 12; conducting the stream to a clarification zone; conducting the waste stream to an ozonation zone; conducting the waste stream to at least one holding zone prior to said ozonation zone and subsequent to said flotation and sedimentation zone; and obtaining a purified waste water stream; and the apparatus suitable for carrying out the process.

20 Claims, 2 Drawing Figures

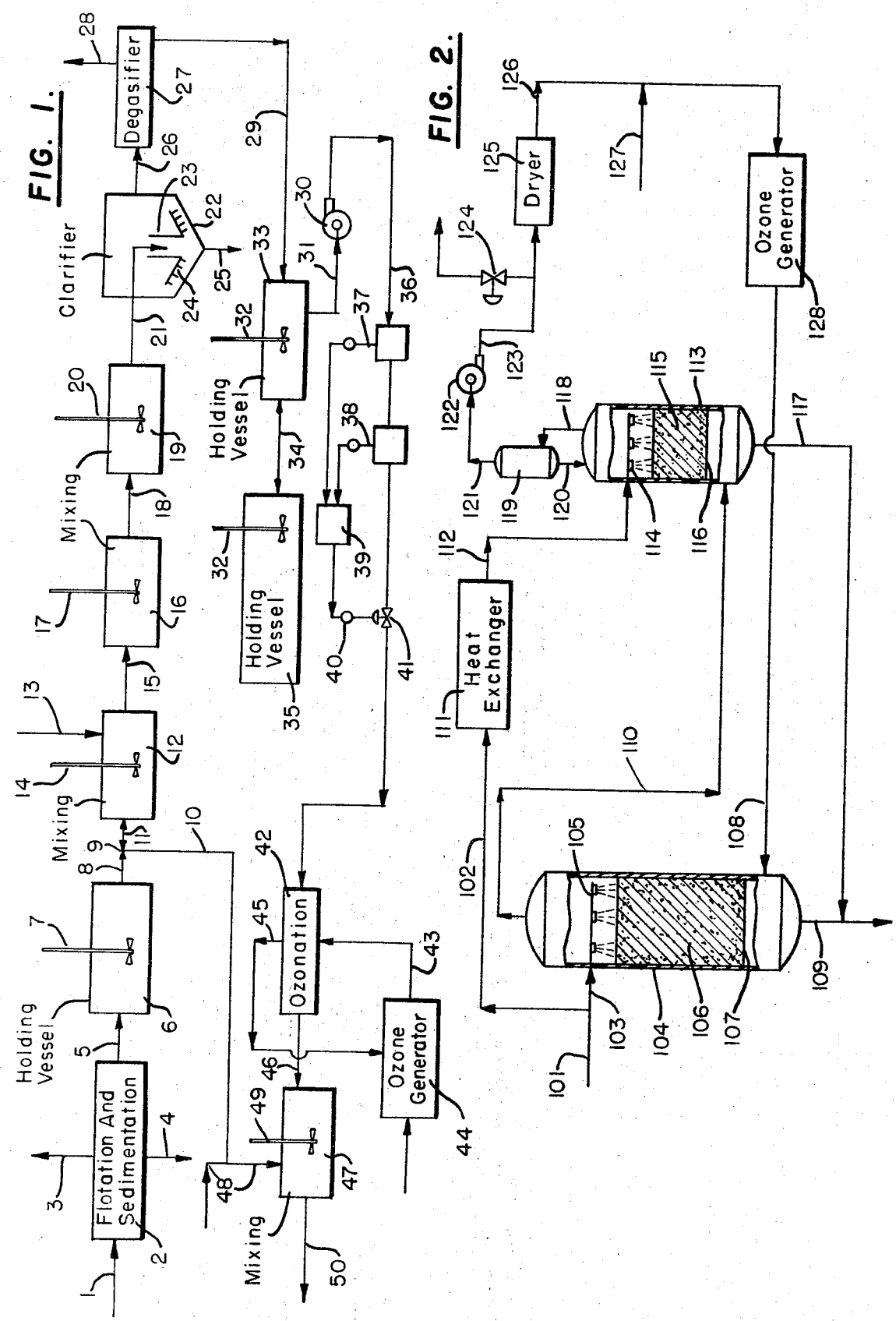

PROCESS AND APPARATUS FOR THE PURIFICATION OF AN AQUEOUS WASTE STREAM FROM A SILICONE-POLYMER PRODUCING PLANT

BACKGROUND OF THE INVENTION

The present invention is concerned with a process for the purification of an aqueous waste stream, and the apparatus suitable therefore. More particularly, the present invention is concerned with a process for the purification of an aqueous waste stream from a silicone-polymer producing plant, and the apparatus therefor.

A wide variety of different products are usually produced in the same silicone-polymer producing plant, involving the use of enormous quantities of water particularly for the hydrolysis of monomeric chlorosilanes to produce the corresponding siloxane polymers. A major problem facing the silicone industry at the present time is the treatment of the aqueous waste water streams so as to convert materials therein which adversely effect the ecology into harmless compounds in order to safely dispose of such waste streams. The problem of purifying these aqueous waste streams is greatly magnified due to the usual production of a vast number of different products in a silicone-polymer producing plant which in turn results in the contamination of the waste water stream with a large variety of different types of harmful impurities.

The effect of the many varieties of different types of impurities in the waste water stream is more than being merely accumulative since the presence of one type of impurity may greatly increase the difficulty of finding a suitable means to remove another type of impurity from the aqueous waste stream.

Another major problem present in attempting to purify aqueous waste streams from silicone plants is that the types and concentrations of impurities vary considerably depending upon which of the many processes in the plant is responsible for the specific aqueous waste stream to be purified at any particular time. Accordingly, the task of designing a relatively inexpensive purification system which can handle all the different waste streams is extremely difficult to accomplish. Moreover, because of the specific types of impurities present in the aqueous waste stream, many conventional types of purification methods are unsuitable or impractical.

For example, the design of a suitable purification process is rather difficult since the aqueous stream contains various inorganic salts and since the concentration of the salts drastically changes from batch to batch. Biological methods are not very practical for purifying aqueous waste streams from silicone producing plants because of the chlorine ion content in the waste stream. In addition, sorption of impurities by a sorbent such as activated carbon is not a very satisfactory purification step because of the presence of silicones in the aqueous waste stream. The silicones are extremely harmful to the normal regeneration processes for such sorbents as activated carbon. Accordingly, the inability to successfully regenerate the carbon to any appreciable extent would render such a process non-feasible from an economic viewpoint. In addition, if the sorbent cannot be regenerated, then the additional problem of disposal of the sorbent must be solved. Various oxidizers such as permanganates have been suggested but such are not entirely satisfactory for the purification purposes of the present invention. One particular disadvantage of such oxidizers is the necessity of employing extremely high temperatures to effect oxidation. Another suggested means of purification which also has not attained general commerical acceptance is electrolysis. Some of the difficulties associated with electrolysis are high equipment cost, slow reaction rates, and extremely high power requirements.

In addition, it has previously been suggested to treat certain industrial waste water streams with ozone under certain conditions. Ozone treatments however have been too expensive and too inefficient for the treatment of the large quantities of waste water which are usually produced in silicone plants. Accordingly, ozone treatment of waste water streams from silicone plants has not heretofore been used to any appreciable extent in large scale commercial operations. Ozone treatments suggested heretofore require relatively large pieces of equipment as compared to the amount of the material being treated. Also such treatments are extremely expensive due to the poor ozone utilization and high cost of ozone production.

The present invention provides a purification process and apparatus therefore which eliminate or at least greatly minimize the problems previously encountered with other purification treatments. The present invention makes it possible to effectively and efficiently treat the aqueous waste streams from silicone plants. The present invention makes it possible to install an efficient commercial treatment set up requiring a minimum amount of capital investment. Moreover, the present invention makes it practical to employ an ozone treatment for purifying the large quantities of waste water streams produced in a silicone plant.

BRIEF DESCRIPTION OF INVENTION

The process aspect of the present invention is concerned with the purification of an aqueous waste stream from a silicone plant which comprises:

A. conducting an aqueous waste stream to a flotation and sedimentation zone wherein water-insoluble materials of densities lower than water are removed from the waste stream as the upper layer in said zone, and wherein water-insoluble materials of densities higher than water are removed from the waste stream as the bottoms from said zone;

B. removing the aqueous waste stream from the flotation and sedimentation zone and adjusting the pH of the aqueous waste stream to a value of at least about 12;

C. conducting the waste stream to a clarification zone wherein solid material having a density greater than water is removed from the aqueous waste stream as bottoms from the clarification zone;

D. removing the aqueous waste stream from the clarification zone and conducting the stream having a pH of at least about 12 to an ozonation zone at a controlled rate so as to achieve a predetermined amount of C.O.D. of organics per unit time entering said ozonation zone;

E. conducting the waste stream to at least one holding zone prior to the ozonation zone and subsequent to the flotation and sedimentation zone;

F. removing the waste stream from said at least one holding zone at said controlled rate; and G. obtaining a purified aqueous waste stream.

The apparatus aspect of the present invention comprises:

A. sedimentation and flotation tank containing an inlet for the introduction of a liquid, a first means in its upper portion for the removal of a liquid, a second means in its lower portion for the removal of a solid, and an outlet interposed between the upper and lower portion for removing a liquid;

B. a storage vessel containing an inlet for the introduction of liquid, an outlet for the removal of liquid, and a mixing means;

C. a mixing vessel containing a first inlet for the introduction of a liquid, a second inlet for the introduction of a liquid, an outlet for the removal of a liquid, and a mixing means;

D. a clarifier containing an inlet for the introduction of a liquid, a first outlet for removal of liquid, and a second outlet in its lower portion for removal of a liquid;

E. an ozonation reactor containing a first inlet for the introduction of a liquid, a second inlet for the introduction of a gas, a first outlet for the removal of a liquid, and a second outlet for the removal of a gas;

F. conduit means connecting:
1. said outlet of said flotation and sedimentation tank to the first inlet of the mixing vessel;
2. the outlet of the mixing vessel to the inlet of the clarifier;
3. the first outlet of the clarifier to the inlet of the storage vessel; and
4. the outlet of the storage vessel to the first inlet of the ozonation reactor; or G. conduit means connecting:
1. the outlet of the flotation and sedimentation vessel to the inlet of the storage vessel;
2. the outlet of the storage vessel to the first inlet of the mixing vessel;
3. the outlet of the mixing vessel to the inlet of the clarifier;
4. the first outlet of the clarifier to the first inlet of the ozonation reactor.

FIG. 1 illustrates a preferred purification process according to the present invention. FIG. 2 illustrates a preferred ozone treatment step employed in the process of the present invention.

DESCRIPTION OF PREFERRED EMBODIMENTS

The aqueous waste streams from silicone plants which can be subjected to the purification process of the present invention include the aqueous waste streams from any and all parts of a typical silicone-polymer producing plant. The aqueous waste streams from a silicone-polymer producing plant generally contain water soluble organic materials, inorganic salts, inorganic acids, water-insoluble materials having density lower than water, and water-insoluble materials having density greater than water. Some water soluble organic materials include methanol, acetone, butanol, and isopropanol. Some inorganic salts generally found in such aqueous waste streams include sodium chloride, and copper chloride. The most usual acid found in silicone plant waste streams is hydrochloric acid. Some water-insoluble impurities having densities lower than water include silicone oils, silicone gels, and aromatic organic liquids such as toluene, benzene, and xylene. Some water-insoluble materials having densities higher than water include silicon and sand. The quantities of these materials and the specific composition of these materials in the waste stream at any particular time will vary greatly depending upon the particular process or processes in the silicone plant from which the aqueous waste stream originated. Since the amounts and identity of impurities can be vastly different, it follows that the Chemical Oxygen Demand (C.O.D.) and the Biological Oxygen Demand (B.O.D.) will also vary. For instance, the C.O.D. of the aqueous waste streams of a typical silicone plant may vary between about 50 and about 200 ppm of water-soluble organic materials. Moreover, it is of course understood that the term "aqueous waste stream from a silicone-polymer producing plant" includes not only the aqueous streams from such plants but also aqueous waste streams from other sources which contain substantially the same impurities.

The aqueous waste stream to be purified according to the present invention is conducted to a flotation and sedimentation zone; wherein the aqueous waste stream is subjected to gravitational separation. Materials which are water-insoluble and have densities lower than water tend to float towards the top of the zone and can thereby be skimmed off and separated from the aqueous waste stream. In addition, those water-insoluble materials having densities higher than the water tend to accumulate towards the bottom of the flotation zone and can be removed therefrom. In a typical industrial operation, about 1,000 to about 3,000 gallons per minute of aqueous waste stream are conducted to the flotation and sedimentation zone. The residence time of the aqueous waste stream in the flotation and sedimentation zone to effect the desired amount of gravitational separation is usually between about 15 and about 120 minutes, and preferably between about 15 and 30 minutes. Of course, it is understood that the residence time in this zone can vary from these values depending upon the specific types and amounts of impurities present in the particular aqueous stream being treated.

The apparatus employed for this step in the purification process of the present invention can be any of the commercially available types of sedimentation tanks as long as it is capable of handling the quantity of material intended to be treated, and is constructed of an acid-resistant material such as carbon-steel lined with polyvinylchloride, suitable asphaltic coating, or synthetic rubbers; acid-resistant brick; or preferably concrete lined with for example an epoxy resin. For a purification set up designed to handle between about 1,000 and about 3,000 gallons per minute (gpm) of aqueous waste stream, a sedimentation tank which is capable of holding 100,000 gallons of aqueous material can be employed.

This step in the process provides a relatively inexpensive means to remove a large portion of water-insoluble materials which otherwise would have to be treated later on in the process with ozone. Accordingly, it is quite apparent that by the removal of these materials in this manner, the impurities to be treated in the very expensive ozone zone later on in the process are reduced; thereby, making it possible to minimize the size and cost of the ozonation reaction zone.

In addition, the flotation and sedimentation zone can advantageously be located so that the aqueous waste streams from the silicone plant will flow by gravity into the flotation and sedimentation zone without the need of a pump. Accordingly, it is preferred that the flotation and sedimentation zone be located at a level lower than the level of the stream as it emerges from the process in the silicone plant, and therefore it is convenient to locate this zone in the ground. An important advantage of not using a pump at this stage of the process is the elimination of the possibility of mixing of the materials in the stream due to pumping so that the separation in this zone is retarded.

The material which is removed from the top and the bottom of the flotation and sedimentation vessel can be disposed of by any convenient means. For example, these materials can be filtered through a sand filter; whereafter, the solids can be collected from the filter and taken elsewhere for disposal. The aqueous stream from the filtration can be recycled to the flotation and sedimentation vessel. If desired, the aqueous stream can be subjected to decantation to remove oils which may have passed through the filter before being recycled to the flotation and sedimentation vessel.

The aqueous waste stream is conducted to a mixing vessel wherein the pH of the aqueous waste stream is adjusted to a value of at least about 12 and preferably between about 12 and about 12.3. The pH of the aqueous stream can be adjusted by adding such strong alkaline materials as sodium hydroxide, potassium hydroxide, ammonium hydroxide, and calcium hydroxide. Preferably, hydrated lime is employed to adjust the pH of the aqueous water solution. The hydrated lime is preferred because of the ease in which it mixes with the aqueous stream. The amount and correspondingly the time needed to adjust the pH to a value of at least about 12 varies according to the quantity of acid, and particularly hydrochloric acid present in the aqueous waste stream, and to the size of the aqueous waste stream.

The pH adjustment is important since the effectiveness of the subsequent ozonation step is greatly improved when the pH of the stream being treated is at least about 12 as compared to streams having lower pH values. Upon mixing the alkaline material with the aqueous waste stream, solid particles form and are suspended in the aqueous stream.

The mixing vessel suitable for effecting the adjustment of the pH of the aqueous stream can be any convenient mixing vessel or series of vessels which are large enough to accomodate the amount of material which is to be processed and which contains suitable means for intimately contacting two or more materials such as a stirrer. The material of construction of the vessel should be resistant to acid and can be prepared from the same materials suggested for the flotation and sedimentation vessel. Preferably the mixing vessel is a series of three vessels. The bulk of the pH adjustment however usually occurs in the first vessel. Accordingly, when employing three vessels in series, it is generally only necessary to use a material which is resistant to acid such as those materials suggested from the flotation and sedimentation vessel for constructing the first vessel of this mixing zone. The other two vessels may be unlined carbon-steel or may be carbon-steel lined with an inexpensive coating such as an asphaltic coating.

For a process designed to handle about 1,000 to 3,000 gpm, it is desirable to employ mixing vessels which are each capable of holding about 30,000 gallons. The mixing in the mixing vessels is turbulent to insure adequate contact between the alkaline material and the aqueous waste material. The mixing in the third vessel, however, may be somewhat slower to aid in promoting flocculation of the suspended solid particles. Also a flocculating agent such as alum or a suitable polyelectrolyte can be added to the third vessel to promote flocculation of the suspended solid particles.

After the pH of the aqueous waste stream is adjusted to at least about 12, the stream is conducted to a clarification zone. In the clarification zone, solid materials which have a density greater than water are permitted to settle to the bottom of the zone whereat they are removed in the form of a sludge or slurry. The solid material removed is the finely divided particles which were formed when the pH of the aqueous waste stream was modified. In addition, materials having densities lower than water may collect on the top of the fluid surface in the clarification zone and may be removed therefrom by skimming.

The usual forms of clarifiers contain a shallow symmetrical concrete tank, means for introducing feed, means for overflowing the clarified liquor, means for discharging the thickened sludge, and a motor-driven revolving mechanism for sweeping the settled solids through a central discharge hopper in the bottom of the tank. Also the removal of the slurry can be effected by diaphragm or plunger pump. Skimming devices may be furnished, if desired, which continuously remove low density material that tends to float on the surface of the aqueous material. Any of the suitable commercially available clarifiers can be employed in this step of the process. For a process handling from about 1,000 to 3,000 gallons per minute it is desirable to use a clarifier having 65 to 100 foot diameter. A more detailed discussion of some suitable clarifiers can be found in the Chemical Engineers Handbook, Perry, Third Edition, New York, McGraw-Hill Book Company, Inc., 1950, pages 943 and 944.

The clarifier is extremely important to the present invention since without it the stream entering the expensive ozonation would contain solid particles which would tend to plug up the lines in the ozonation equipment, and would cause a decrease in the effectiveness of the ozonation. Because of the relative high cost of the ozonation step, any possible source of trouble therein should be eliminated, if possible. In addition, the sludge formed tends to carry with it a portion of the organics present in the initial water, thus reducing the COD to be removed by ozone.

The slurry or sludge which is removed from the clarifier can be further processed, if desired, to facilitate its disposal. For instance, since the sludge contains a small concentration of solids (e.g., 0.2%) it can be conducted to a thickener whereby the solids content is concentrated such as to about 3 to 10%. The concentrated sludge can then be conducted to a filter, whereas, the liquid from the thickener can be recycled to the clarifier. A solid material is obtained from the filter which can be conveniently disposed of such as for land fill, since it contains mainly calcium and magnesium hydroxides as well as inerts originally present in the line. A liquid is obtained from the filter which can be recycled to the clarifier.

After the clarifier, the aqueous waste material is subjected to an ozonation treatment. The aqueous waste stream at a pH of at least about 12 and preferably from about 12 to 12.3 is conducted to the ozonation zone at a rate controlled so as to have a predetermined amount of organic contaminant measured as C.O.D. per unit time being subjected to the ozonation treatment. Since the concentration and composition of the organic materials which are susceptible to ozonation vary greatly depending upon the particular process in the silicone plant from which the aqueous waste stream originated, it is essential that at least one holding zone be employed before the ozonation zone in order to provide a stream with a predetermined amount of organic contaminants per unit time for treatment in the ozonation zone. Since the ozonation step requires a large investment for an ozone generator, the ozonation reactor(s) and other necessary equipment, it is extremely important to keep the ozonation equipment to a minimum size without harming the quality of the product or retarding the overall process. Accordingly, the at least one holding zone makes it possible to control the load of organic material per unit time which enters the ozonation zone. For instance, when the concentration of organics is relatively high, then flow rate of the stream into the ozonation zone will be low, and the difference in the flow rate into the holding zone and into the ozonation zone will result in the accumulation of material in the holding zone. Then when the concentration of organics of the stream entering the zone is relatively low, the flow rate of material into the ozonation zone will be high. Accordingly if it is higher than the flow rate into the holding zone, the amount of material in the holding zone will be decreased.

Therefore, by incorporating a holding zone which requires relatively inexpensive equipment it is possible to design the relatively expensive ozonation equipment to treat a load much less than the peak load which enters the purification process at any particular time. Accordingly, the size of the ozonation equipment is significantly decreased along with a comparable decrease in its cost. Moreover, besides a decrease in the cost, a decrease in the size also lessens the chance of malfunction in the ozonation process in that smaller size equipment is much easier to operate and maintain.

The holding zone is located somewhere between the flotation and sedimentation zone and the ozonation zone. Generally the holding zone is located subsequent to the flotation and sedimentation zone and prior to the pH adjustment or is located subsequent to the clarification zone and prior to the ozonation zone. Preferably the holding zone is between the clarification and ozonation zones.

Moreover, it may be desirable to include holding zones at both of the above locations. A holding zone is preferably present after the clarification zone since at this position it can be used to control the load of organics per unit time entering the ozonation zone more easily. In addition, the presence of another holding zone prior to the pH adjusting is desirable since the size of the pH adjusting vessels can be minimized due to the ability to add a predetermined amount of acid per unit time to the pH adjusting vessels. Accordingly, the pH adjusting equipment can be designed to handle amounts of acid per unit time which are less than the maximum load which would have to be treated at any particular time.

The apparatus suitable for this step of the process can be any storage vessel or vessels which are large enough to accomodate the maximum amount of material which would be present therein at any particular time. For a purification process designed to handle about 1,000 to about 3,000 gallons per minute, a holding vessel capable of holding between about 500,000 to about 600,000 gallons of material is suitable. In addition, the storage vesseel may contain suitable mixing means such as conventional stirrers to sufficiently mix the various aqueous streams entering the holding zone. If the holding vessel is present before the pH adjustment, it should be constructed of a material which is resistant to acid such as those materials described for the flotation and sedimentation vessel. A holding vessel present after the clarification need not be constructed of acid resistant material and can be made of unlined carbon-steel or unlined concrete.

A preferred holding zone employed after the clarification zone includes a relatively small holding vessel, the lower portion of which is connected to the lower portion of a much larger holding vessel by a conduit means. Both vessels are at the same level so that material is transferred between them by gravitational flow. The size of the small holding tank for a process treating from about 1,000 to 3,000 gallons per minute of material would be about 4-5 feet in diameter and about 10 to 11 feet high. The larger holding vessel for such a process would be about 10-11 feet high and 80-100 feet in diameter and capable of holding about 500,000 to about 600,000 gallons of the aqueous material. In addition, the preferred holding zone includes a pump which is connected to the smaller vessel, and is also connected to a means to control the organic material load delivered to the ozonation step. The control means can, for instance, measure and control the flow and can include a flow rate measuring device, an organic matter analyzer, a valve, and valve controller to the outlet side of the pump. When the amount of organics per unit time is high, then the flow rate of the material into the ozonation zone is low. On the other hand, when the amount of organics in the stream is low, the flow rate of material into the ozonation zone is high. Alternatively, the flow can be controlled by controlling a valve in the outlet side of the pump with measurements of the amount of ozone present in the off gases from the ozonation reactor. For instance, when the amount of ozone in the off gases is high, then the flow rate of aqueous waste water is correspondingly increased and when the amount of ozone is low then the flow rate of aqueous waste water is decreased, so as to keep an approximately constant concentration of ozone in the off gases.

The next step in the present invention is an ozonation step. Generally the ozonation treatment of the aqueous waste stream is effected by introducing the aqueous stream into the upper portion of an ozonation zone while introducing an ozone-containing gas into the lower portion of the ozonation zone whereby the liquid and gas streams will flow counter currently. Preferably the ozonation zone is a packed tower.

The preferred ozone treatment of the aqueous waste material comprises:

A. introducing a major portion of the aqueous waste stream into the upper portion of a first ozonation zone;

B. introducing the remaining portion of the stream into the upper portion of a second ozonation zone, wherein the temperature of said remaining portion is from about 0° C to about 5° C;

C. introducing ozone-containing gas into the lower portion of said first ozonation zone;
D. removing an ozone-treated product from the lower portion of said first ozonation zone;
E. removing a gaseous stream from the upper portion of said first ozonation zone;
F. conducting said gaseous stream removed from the upper portion of said first ozonation zone to the bottom portion of said second ozonation zone;
G. removing an ozone-treated product from the lower portion of said second ozonation zone;
H. removing a gaseous stream from the upper portion of said second ozonation zone;
I. conducting the gaseous stream removed from the upper portion of said second ozonation zone to an ozone-generating zone;
J. removing ozone-containing gas from the ozone-generating zone and conducting it to the lower portion of said first ozonation zone;
K. said second ozonation zone being smaller in size than said first ozonation zone, but providing more efficient per unit volume contact between the aqueous material and the gas flowing therethrough than the per unit volume contact provided by said first ozonation zone.

The apparatus of the preferred ozone treatment comprises:

A. a first packed tower containing a first inlet in its upper portion for the introduction of liquid; a second inlet in its lower portion for the introduction of gas; a first outlet in its lower portion for the removal of a liquid and a second outlet in its upper portion for the removal of a gaseous stream;
B. a second packed tower containing a first inlet in its upper portion for the introduction of liquid; a second inlet in its lower portion for the introduction of a gaseous stream, a first outlet in its lower portion for the removal of a liquid and a second outlet in its upper portion for the removal of a gaseous stream;
C. said second packed tower being smaller than said first packed tower but containing more efficient packing than that in said first packed tower;
D. an ozone-generating means which contains an inlet for receiving a gaseous stream, and an outlet for removing ozone-containing gas; and
E. conduit means connecting:
  1. said second outlet of said first packed tower with the second inlet of said second packed tower;
  2. said outlet of said ozone-generating means to the second inlet of said first packed tower; and
  3. said second outlet of said second packed tower with the inlet of said ozone-generating means.

According to this preferred ozonation, a major portion of the aqueous material to be treated but less than the entire portion is introduced into the upper portion of a first ozonation zone. Usually from about 70 to about 95% by weight of the liquid material is introduced into the first ozonation zone, and preferably from about 80 to 90% by weight of the material is introduced into the first ozonation zone. The temperature of the aqueous material entering the first ozonation zone is generally the temperature of the liquid as received from the previous step such as the clarifier or holding tank, and is usually between about 0° C and about 35° C.

The first ozonation zone is a packed tower which, of course, must be big enough to handle the quantity of liquid material which is to flow therethrough. For instance, when the amount of liquid material entering the first ozonation zone is from about 1,000 to about 3,000 gallons per minute, the tower should have a diameter of about 6–8 feet and a height of about 40 feet. The tower can be constructed of any construction material which is resistant to oxidation and ozonation such as carbon-steel lined with a suitable material such as teflon, polyvinylchloride or polypropylene.

The tower can be packed with any of the known packing materials employed in such towers. Some conventional packing shapes include those available under the trade designations Raschig rings, Berl saddles, Pall rings, and Intalox saddles. The packing can be constructed of any convenient material such as porcelain, clay, carbon, and suitable plastics. The packing material employed in the first ozonation zone has a size from about one-half inch to about 2 inches. Of particular interest are Intalox saddles. It is preferred that the packing in the column be random rather than stacked. In addition, the first ozonation zone may contain liquid redistributors to redirect the downward flow of the liquid material towards the center of the packing to prevent what is commonly referred to as channeling.

That portion of the aqueous waste material to be subjected to the ozonation of the present invention which has not been introduced into the first ozonation zone is introduced into the upper portion of a second ozonation zone. The temperature of the portion of the aqueous waste stream which is introduced into the second ozonation zone can be the same as the temperature of the water introduced into the first ozonation zone. However more economical operation is obtained if the temperature of the water introduced to the second ozonation zone is between about 0°C and about 5°C, and preferably is between about 0.5°C and about 5°C. The most preferred temperature is between about 1° and 2°C. The temperature of the stream is at least about 0°C and preferably at least about 0.5°C since it must be high enough to avoid the formation of any appreciable amounts of ice in the stream which would seriously retard the flow of the aqueous stream through the tower. If the temperature of the stream is higher than about 5°C, the amount of water vapor present in the gaseous stream to be taken off as overhead from the second ozonation zone will be such as to cause processing problems downstream as will be discussed hereinafter.

The temperature of the aqueous stream as received from the previous step may be between about 0°C and about 5°C; and therefore, the requisite amount can be conducted to the second ozonation zone without first being subjected to a heat exchange step. However, if the temperature of that portion of the aqueous stream which is to be conducted to the second ozonation zone is higher than about 5° C, it will be preferable to conduct it to a cooling zone prior to introducing it into the second ozonation zone.

The cooling zone can be any known heat exchanger suitable for handling the desired quantity of material. It may be advantageous to conduct the cooling in a vacuum type heat exchanger under vacuum such as at about 5 mm Hg of absolute pressure to remove gases such as oxygen and nitrogen therefrom, so that the liquid stream will have an increased capacity for absorbing such gases from the gaseous stream in the second ozonation zone. This, in turn, may be advantageous with regard to subsequent processing of the gaseous stream as will be discussed hereinbelow.

Usually between about 5 and 30%, and preferably between about 10 and 20% of the aqueous waste material which is to be subjected to ozonation is introduced into the second ozonation zone. The second ozonation zone is also a packed tower; however, it is smaller in size than the first packed tower. For instance, when the amount of liquid material entering the second ozonation zone is from about 100 to about 600 gpm, the tower should have a diameter of about 2 to 3 feet and a height of about 16 to 25 feet.

The second tower can be constructed of any suitable construction material which is resistant to oxidation and ozonation such as carbon-steel lined with polyvinyl chloride, polypropylene, or teflon. In addition, the second ozonation zone may contain liquid redistributors to redirect the downward flow of the liquid material towards the center of the packing to prevent what is commonly referred to as channeling.

In addition, the second packed tower contains packing which is more efficient with respect to per unit volume contact than is the packing in the first packed tower. The more efficient packing can be achieved by employing the same or different type of packing shape as used in the first tower except employing a smaller size and/or by employing another type of packing shape which is more efficient due to its shape and packing characteristics. Accordingly, the packing employed in the second tower is more expensive than the packing used in the first packed column.

Since the second packed tower is relatively small compared to the first packed tower, the use of more expensive packing does not appreciably increase the cost of the overall process. The packing in the second tower is usually between one-half inch and 1 inch. Of particular interest are Intalox saddles.

Since the relative amount of ozone which will be present in the gas entering the second ozonation zone is quite small the second tower is provided with this relatively expensive packing in order to insure adequate contact between the downwardly flowing aqueous material and upwardly flowing gas to effect the desired ozonation.

It is, of course, understood that the first and/or second ozonation zones could contain a plurality of towers in parallel in place of a single tower.

The ozone-containing gas which is introduced into the lower portion of the first ozonation zone contains from about 2 to about 8% by weight of ozone, from about 70 to about 98% by weight of oxygen with the balance being nitrogen, and possibly small quantities of other gases which are conventionally present in air such as carbon dioxide, argon, and the like. Preferable, the ozone-containing gas should contain up to about 15% by weight of nitrogen. For best results, it has been found that the amount of ozone-containing gas incorporated into the first ozonation zone should be selected so as to provide about 3.4 pounds of ozone per pound of C.O.D. of contaminants to be treated in the ozonation step. The ozone-containing gas flows countercurrent to the flow of the aqueous waste material in the ozonation zone.

A typical ozone-treated product which is removed from the first ozonation zone at the lower portion of the zone is a decontaminated material having a C.O.D. of about 5–45 ppm. The product can be returned to the natural source from where the liquid was obtained or can be recycled for use in the plant in place of fresh water. If the ozone-treated product is to be returned to a natural source, then it should be further treated to adjust the pH of the product to between about 6 and 9.

The gaseous stream which is removed from the upper portion of the first ozonation zone, and conducted to the lower portion of the second ozonation zone contains up to about 0.5% by weight of ozone. Although the amount of ozone present in the gaseous stream in the second ozonation zone is small, it is sufficient to provide a significant reduction in the organic materials present in the liquid stream flowing downward in the second ozonation zone and is of sufficient amount to treat the liquid material in this zone since the quantity of liquid material added to the second ozonation zone is relatively small compared to the quantity employed in the first ozonation zone.

For the best utilization of ozone, it is preferred that the percent of aqueous material treated in the second ozonation zone based upon the total aqueous material being treated in the ozonation closely correspond to the relative percent of ozone which is present in the gaseous stream entering the second ozonation zone based upon the total amount of ozone initially present in the ozone-containing gas.

Although the amount of ozone present in the gaseous stream entering the second ozonation zone is small when based upon the total amount of gas flowing through thhe second ozonation zone, this amount is appreciable when compared to the total amount of ozone introduced into the system via the first ozonation zone. Accordingly, the utilization of the ozone in the second ozonation zone represents a significant increase in the efficiency of the present process. Since the cost of producing ozone is quite high, the increased utilization accomplished by this second and smaller ozonation packed tower results in quite a significant decrease in the overall cost of the process along with a substantial increase in the efficiency of the process.

A typical ozone-treated product removed from the second ozonation zone has a C.O.D. which is comparable to that of the product removed from the first ozonation zone. Since the second ozonation tower is more efficient than the first ozonation tower, and since much less liquid material flows therethrough, it is possible to obtain comparable treatments in the two columns. The product removed from the second ozonation zone can be mixed with the product from the first ozonation zone and then further treated as will be described hereinbelow.

A gaseous stream is removed from the upper portion of the second ozonation zone, which contains at most about 0.01% by weight of ozone and up to about 1.0% by weight of water vapor. As previously discussed, the water vapor is so low since the temperature of the liquid stream introduced into the second ozonation zone was at most about 5°C. Accordingly, in view of this low temperature, the quantity of water vapor taken off by the gaseous stream is held to a minimum.

The gaseous stream removed from the upper portion of the second ozonation zone is then utilized for the preparation of the ozone-containing gas which is introduced into the first ozonation zone. Accordingly, the gaseous stream removed from the upper portion of the second ozonation zone is subjected to ozone generation in a suitable ozone generating zone.

The gaseous stream is mixed with oxygen containing gas such as pure oxygen in an amount to replenish the amount of oxygen and ozone which was used up in the two ozonation zones. Before being conducted to an ozone generator, it is usually necessary to dry the gases in order to obtain a suitable gas for generating zone such as one having a dew point of from about −40° to about −60° F. A suitable type of dryer is one which employs a desiccant such as silica gel, molecular sieves, and alumina. Since the removal of water vapor from such a gas is not very efficient, it is important that the water vapor content of a gas entering the dryer be as small as possible since minor increases in the amount of water vapor result in disproportionately increases in the size of the dryer. Accordingly, by restricting the temperature of the liquid entering the second ozonation column to a maximum of about 5°C, quite a significant reduction in the size and corresponding expense of the gas dryer is attained.

In addition, the nitrogen content of the gas entering the ozone generator should be as low as possible since it affects the efficiency of the ozone generator. As mentioned above the amount of nitrogen gas present is reduced due to the contact in the second packed tower by being absorbed by the downwardly flowing liquid of the second packed tower. If the gaseous stream leaving the second packed tower has too high a nitrogen content for the ozone generating step, then a suitable gas bleed can be provided after the second packed tower and prior to the oxygen addition.

Moreover, it is advantageous to conduct the gaseous stream leaving the second ozonation zone to a de-entrainer or de-mister whereby liquid water droplets which may be entrained in the gaseous stream can be removed. Any conventional de-entraining device can be employed. For instance, the de-entraining device can be a column containing means such as tray or baffles to cause the gaseous stream to flow in a torturous path through the column thereby causing separation of the gas and liquid.

The dried gaseous stream is then conducted to an ozone-generating device. Any of the available ozone-generating devices can be employed. Of particular interest are those generators available under the trade designation "Advanced Corona Generator" from Purification Sciences, Inc., 75 East North Street, New York, N.Y. 14456. One such generator is described in German Offen. 2,026,622 Application June 4, 1969, issued Dec. 10, 1970, and entitled "Corona Discharge Apparatus for Generating Ozone under Pressure". This type of ozone-generating apparatus is preferred since according to the manufacturer, it can produce higher percentages of ozone in higher quantities than obtained from the more conventional ozone generators. However, other commercially available ozone generators such as ones of the concentric tube type or the plate type can be utilized. For example, such generators are manufactured by the Welsbach Corporation, and a detailed discussion of these types of generators can be found in the McGraw-Hill Encyclopedia of Science and Technology, McGraw-Hill, Inc., 1966, Volume 9, page 479. The ozone-containing gas obtained from the ozone generator is then introduced into the bottom portion of the first packed tower.

As mentioned above, if the ozone-treated product is to be sent to a natural water source, its pH should be adjusted to a value between about 6 and about 9. This is necessary since the aqueous waste stream which was treated in the ozonation reactor has a pH of at least about 12 which is too high to be discharged into the natural source from which the water was obtained. Therefore, an acid such as hydrochloric acid can be added to the aqueous waste stream to reduce the pH to between about 6 and about 9. The acid employed to adjust the pH can be obtained from any outside means. In addition, it may be possible to employ as the acid solution or portion thereof, a portion of the aqueous waste stream after the flotation and sedimentation vessel and prior to the first pH adjustment. This can be done if the acidity of this aqueous waste stream is high as compared to the alkalinity of the ozone-treated product and if the organic concentration in the stream is not too high.

Another advantageous but not essential step in this process is the use of a degasification zone subsequent to the clarifying zone and prior to the holding zone, if present after the clarifying zone, to remove nitrogen from the aqueous waste stream. The removal of the nitrogen is advantageous for the ozonation step as discussed above. The degasification can be accomplished by use of vacuum such as at about 5 mm Hg of absolute pressure. The degasifier can be a commercially available vacuum type heat exchanger, capable of handling the desired quantity of material.

The present invention will be more fully understood by reading the following description in conjunction with the figures which schematically illustrate a preferred purification of an aqueous waste stream from a silicone-polymer producing plant.

In FIG. 1, line 1 connects to a flotation and sedimentation vessel 2. Sedimentation vessel 2 contains removal means 3 and 4, and outlet line 5 which connects to holding tank 6. Holding tank 6 is provided with stirring means 7 and outlet line 8. Outlet line 8 contains a valve 9 at which point it splits up into lines 10 and 11. Line 11 connects to a mixing vessel 12. Mixing vessel 12 contains an inlet line 13, mixing means 14 and outlet line 15. Outlet line 15 connects to mixing vessel 16 which is provided with mixing means 17 and outlet line 18. Outlet line 18 connects to mixing vessel 19 which is provided with mixing means 20 and outlet line 21. Outlet line 21 connects to clarifier 22 which has a material introducing means 23, scraping means 24, and outlet means 25 and 26. Outlet means 26 connects to a vacuum degasifier 27 which is provided with outlet lines 28 and 29. Outlet line 29 connects to storage vessel 33 which has an outlet line 34 which connects to storage vessel 35 and outlet line 31. Storage vessels 33 and 35 contain stirrers 32. Outlet line 31 connects to pump 30 which has an outlet line 36. Outlet line 36 contains a flow measuring device 37, an organics concentration analyzer 38, a multiplier element 39, a valve 41, and a valve control means 40. Line 36 connects to ozonation reactor 42 which contains liquid outlet line 46, gas outlet line 45, and gas inlet line 43. Outlet line 45 connects to ozone generator 44. Outlet line 46 connects to mixing vessel 47. Mixing vessel 47 contains inlet line 48 and outlet line 50. Line 10 from line 8 connects to line 48 before line 48 enters mixing vessel 47.

An industrial aqueous waste stream from a silicone producing plant is conducted through line 1 through sedimentation tank 2 wherein water-insoluble materials having densities lower than water are skimmed off the top of the aqueous waste material and wherein water-insoluble materials having densities greater than water removed from the bottom of the sedimentation tank. An aqueous waste stream is removed from this sedimentation tank through line 5 and is conducted to holding tank 6. The aqueous stream is then removed from the holding tank through line 8. A portion of the aqueous stream is fed from line 10 to line 48 to mixing vessel 47, depending upon the requirements discussed above for use of this stream as a back neutralization source of material. The rest of the aqueous stream is conducted to a mixing vessel 12 through line 11. In addition, an alkaline material is added to the mixing vessel 12 via line 13. The stream is removed from vessel 12 via line 15 and conducted to vessel 16 whereafter it is removed via line 18 and conducted to vessel 19. A stream having a pH of at least about 12 is removed from vessel 19 by line 21 and is conducted to the clarifier 22 whereby the material flows through conduit 23. A slurry is removed from clarifier 22 through line 25. An aqueous waste stream is removed from clarifier 22 via line 26 whereafter it is conducted to degasifier 27. Gases are removed through line 28 and an aqueous waste stream is removed from the degasifier via line 29 whereby it is conducted to small holding tank 33. The stream is pumped from tank 33 via line 31 by pump 30 and is analyzed for amount of material and for concentration of organics by flow measurer 37 and organics analyzer 38 respectively. These measurements are then multiplied in multiplier 39 whereby a flow controller 40 can regulate the opening or closing of valve 41 in accordance with the above measurements to provide a flow which introduces a predetermined amount of organics per unit time into the ozonation zone. Material will flow from small tank 33 to large tank 35 which is at the same level or will flow from the large to the small tank depending upon the relative flow rates of material into the small tank from line 29 and out of the tank through line 31.

The material entering the ozonation reactor through line 36 is contacted with ozone-containing gas entering through line 43. A gaseous stream is removed from ozonation reactor 42 via line 45 and is conducted to an ozone generator 44 whereby the ozone-containing gas is generated and removed therefrom and conducted back to the ozonation reactor. An ozone-treated aqueous product is removed from ozone reactor 42 and is conducted to a mixing vessel 47 via line 46. An acid such as hydrochloric acid is added to mixing vessel 47 through line 48. A product having a pH between the range of about 6 and about 9 is removed therefrom through line 50.

In FIG. 2, line 101 splits up into line 102 and line 103, while line 103 connects to a packed tower 104. Packed tower 104 contains a liquid distributor 105, packing 106, packing support 107, a liquid outlet 109 and an overhead outlet line 110. Overhead outlet line 110 connects to packed tower 113. Line 102 connects to heat exchanger 111 which is provided with an outlet line 112 which connects to packed tower 113. If a degasifier is used and as a consequence the temperature of the water is about 5° to 10°C or below, then the heat exchanger 111 becomes unnecessary. Alternatively, the degasifier 27 may be deleted and only heat exchanger 111 be used, which could result in a more economic operation since only a portion of the total water stream is conducted through this heat exchanger. Packed tower 113 is provided with a liquid distributor 114, packing 115, packing support 116, liquid outlet 117, and overhead outlet line 118. Liquid outlet line 117 connects to liquid outlet line 109 from the packed tower 104. Overhead line 118 connects to de-entrainer 119 which contains liquid outlet line 120 and gas outlet line 121. Liquid outlet line 120 connects to tower 113. Outlet line 121 connects to compressor pump 122 which is provided with outlet line 123. Line 123 is provided with valve 124 and connects to dryer 125. Dryer 125 is provided with an outlet 126 which in turn combines with line 127 and then line 126 connects to ozone generator 128. Ozone generator 128 is provided with an outlet line 108 which connects to packed tower 104.

The aqueous waste stream from the holding zone 33 is conducted through line 101 whereby a predominant portion of the stream enters the packed tower 104 via line 103 while the remainder of the waste water stream is conducted to heat exchanger 111 via line 102. The waste water is distributed to the packing of the first packed tower through the distributor 105 and flows downward through the packing in the tower. An ozone-containing gas is conducted to the first packed tower and flows upwardly through the packings in the tower. An ozone-treated product is removed from the first packed tower through line 109. A vapor stream is removed as the overhead from the first packed tower through line 110 and is introduced into the bottom portion of the second packed tower 113. Cooled liquid is removed from the heat exchanger 111 through line 112 and is conducted to the second packed tower and distributed into the tower by the distributor 114. The liquid stream flows downward through the tower through the packing 115 while the vapor stream from line 110 flows upwardly through the packed tower. An ozone treated liquid product of reduced C.O.D. is removed from the packed tower through line 117 whereinafter it is combined with the product from packed column 104 at line 109. An overhead vapor stream is removed from the second packed tower through line 118 and is conducted to de-entrainer 119. Liquid is removed from deentrainer through line 120 and a vapor is removed through line 121. The liquid is returned to tower 113. The vapor stream is conducted to compressor pump 122 and exits pump 122 through line 123. A portion of this vapor stream is bled from the system by opening valve 124. The gas is then conducted to a dryer 125. The dried gas is removed from the dryer through line 126. Oxygen is added to the vapor stream by way of line 127. The gas is then sent to an ozone-generating device 128. The ozone-containing gas is removed from the ozone-generating device through line 108 and is fed to the bottom portion of the first packed tower 104.

What is claimed is:

1. Process for the purification of aqueous waste material from a silicone-polymer producing plant which comprises:

A. conducting an aqueous waste stream to a flotation and sedimentation zone, wherein water-insoluble materials of densities lower than water are removed from said waste stream as the upper layer in said zone, and wherein water-insoluble materials with densities higher than water are removed from the waste stream as the bottoms from said zone;

B. removing said aqueous waste stream from said flotation and sedimentation zone and adjusting the pH of said aqueous waste stream to a value of at least about 12;

C. conducting said waste stream to a clarification zone wherein solid material having a density greater than water is removed from the aqueous waste stream as bottoms from the clarification zone;

D. removing said aqueous waste stream from said clarification zone and conducting said stream having a pH of at least about 12 to an ozonation zone at a controlled rate so as to achieve a predetermined amount of C.O.D. of organics per unit time entering said ozonation zone;

E. conducting said aqueous waste stream to at least one holding zone prior to the ozonation zone and subsequent to the flotation and sedimentation zone;

F. removing said aqueous waste stream from said at least one holding zone at said controlled rate; and G. obtaining a purified aqueous waste stream.

2. The process of claim 1 wherein said at least one holding zone is subsequent to said clarification zone and prior to said ozonation zone.

3. The process of claim 1 wherein said at least one holding zone is subsequent to said flotation and sedimentation zone and prior to the pH adjusting.

4. The process of claim 1 wherein said at least one holding zone includes a first holding zone which is subsequent to said flotation and sedimentation zone and prior to the adjusting of the pH; and a second holding zone which is subsequent to said clarification zone and prior to said ozonation zone.

5. The process of claim 1 wherein the pH of said aqueous waste stream is adjusted to a value between about 12 and about 12.3.

6. The process of claim 1 wherein hydrated lime is added to said aqueous waste stream to adjust the pH to a value of between about 12 and about 12.3.

7. The process of claim 1 wherein said ozonation is effected by introducing said aqueous stream into the upper portion of an ozonation zone while introducing an ozone-containing gas into the lower portion of an ozonation zone.

8. The process of claim 1 which further includes readjusting the pH of said aqueous stream after said ozonation zone to a value between about 6 and about 9.

9. The process of claim 1 wherein said ozonation comprises:

A. introducing a major portion of said aqueous stream into the upper portion of a first ozonation zone;

B. introducing the remaining portion of said aqueous stream into the upper portion of a second ozonation zone, wherein the temperature of said remaining portion is between about 0° C and about 5° C;

C. introducing an ozone-containing gas into the lower portion of said first ozonation zone;

D. removing an ozone-treated product from the lower portion of said first ozonation zone;

E. removing a gaseous stream from the upper portion of said first ozonation zone;

F. conducting said gaseous stream removed from the upper portion of said first ozonation zone to the lower portion of said second ozonation zone;

G. removing an ozone-treated product from the lower portion of said second ozonation zone;

H. removing a gaseous stream from the upper portion of said second ozonation zone;

I. conducting the gaseous stream removed from the upper portion of said second ozonation zone into an ozone-generating zone;

J. removing ozone-containing gas from said ozone-generating zone and conducting it into the lower portion of said first ozonation zone; and K. said second ozonation zone being smaller in size than said first ozonation zone but providing more efficient per unit volume contact between the liquid material and the gas flowing therethrough than the per unit volume contact provided by said first ozonation zone.

10. The process of claim 9 which further includes introducing said remaining portion of said aqueous stream into a cooling zone in order to cool the liquid material to a temperature of between about 0° C and about 5° C prior to introducing it into the upper portion of the second ozonation zone.

11. Process for the purification of aqueous waste material from a silicone-polymer producing plant which comprises:

A. conducting an aqueous waste stream to a floatation and sedimentation zone wherein water-insoluble materials of densities lower than water are removed from said waste stream as the upper layer in said zone, and wherein water-insoluble materials with densities higher than water are removed from the waste stream as the bottoms from said zone;

B. removing said aqueous waste stream from said flotation and sedimentation zone and adjusting the pH of said aqueous waste stream to a value of at least about 12;

C. conducting said waste stream to a clarification zone wherein solid material having a density greater than water is removed from the aqueous waste stream as bottoms from the clarification zone;

D. removing said aqueous waste stream from said clarification zone and conducting said stream having a pH of at least about 12 to an ozonation zone at a controlled rate so as to achieve a predetermined amount of C.O.D. of organics per unit time entering said ozonation zone, wherein said ozonation comprises:

1. introducing a major portion of said aqueous stream into the upper portion of a first ozonation zone;

2. introducing the remaining portion of said aqueous stream into the upper portion of a second ozonation zone, wherein the temperature of said remaining portion is between about 0°C and about 5°C;

3. introducing an ozone-containing gas into the lower portion of said first ozonation zone;

4. removing an ozone-treated product from the lower portion of said first ozonation zone;

5. removing a gaseous stream from the upper portion of said first ozonation zone;

6. conducting said gaseous stream removed from the upper portion of said first ozonation zone to the lower portion of said second ozonation zone;
7. removing an ozone-treated product from the lower portion of said second ozonation zone;
8. removing a gaseous stream from the upper portion of said second ozonation zone;
9. conducting the gaseous stream removed from the upper portion of said second ozonation zone into an ozone-generating zone;
10. removing ozone-containing gas from said ozone-generating zone and conducting it into the lower portion of said first ozonation zone; and
11. said second ozonation zone being smaller in size than said first ozonation zone but providing more efficient per unit volume contact between the liquid material and the gas flowing therethrough than the per unit volume contact provided by said first ozonation zone;

E. conducting said aqueous waste stream to at least one holding zone prior to the ozonation zone and subsequent to the flotation and sedimentation zone;

F. removing said aqueous waste stream from said at least one holding zone at said controlled rate; and G. obtaining a purified aqueous waste stream.

12. Process for the purification of industrial aqueous waste comprising water soluble organic materials, inorganic salts, inorganic acids, water-insoluble materials having density lower than water, and water-insoluble materials having density greater than water, said process comprising:

A. conducting an aqueous waste stream to a flotation and sedimentation zone, wherein water-insoluble materials of densities lower than water are removed from said waste stream as the upper layer in said zone, and wherein waterinsoluble materials with densities higher than water are removed from the waste stream as the bottoms from said zone;

B. removing said aqueous waste stream from said flotation and sedimentation zone and adjusting the pH of said aqueous waste stream to a value of at least about 12;

C. conducting said waste stream to a clarification zone wherein solid material having a density greater than water is removed from the aqueous waste stream as bottoms from the clarification zone;

D. removing said aqueous waste stream from said clarification zone and conducting said stream having a pH of at least about 12 to an ozonation zone at a controlled rate so as to achieve a predetermined amount of C.O.D. of organics per unit time entering said ozonation zone;

E. conducting said aqueous waste stream to at least one holding zone prior to the ozonation zone and subsequent to the flotation and sedimentation zone;

F. removing said aqueous waste stream from said at least one holding zone at said controlled rate; and G. obtaining a purified aqueous waste stream.

13. The process of claim 12 wherein said ozonation comprises:

A. introducing a major portion of said aqueous stream into the upper portion of a first ozonation zone;

B. introducing the remaining portion of said aqueous stream into the upper portion of a second ozonation zone, wherein the temperature of said remaining portion is between about 0°C and about 5°C;

C. introducing an ozone-containing gas into the lower portion of said first ozonation zone;

D. removing an ozone-treated product from the lower portion of said first ozonation zone;

E. removing a gaseous stream from the upper portion of said first ozonation zone;

F. conducting said gaseous stream removed from the upper portion of said first ozonation zone to the lower portion of said second ozonation zone;

G. removing an ozone-treated product from the lower portion of said second ozonation zone;

H. removing a gaseous stream from the upper portion of said second ozonation zone;

I. conducting the gaseous stream removed from the upper portion of said second ozonation zone into an ozonegenerating zone;

J. removing ozone-containing gas from said ozone-generating zone and conducting it into the lower portion of said first ozonation zone; and K. said second ozonation zone being smaller in size than said first ozonation zone but providing more efficient per unit volume contact between the liquid material and the gas flowing therethrough than the per unit volume contact provided by said first ozonation zone.

14. Apparatus suitable for the purification of an aqueous waste stream from a silicone-polymer producing plant which comprises:

A. sedimentation and flotation tank containing an inlet for the introduction of a liquid, a first means in its upper portion for the removal of a liquid, a second means in its lower portion for the removal of solid, and an outlet interposed between said upper and lower portion for removing a liquid;

B. a storage vessel containing an inlet for the introduction of liquid, an outlet for the removal of liquid, and a mixing means;

C. a mixing vessel containing a first inlet for the introduction of a liquid, a second inlet for the introduction of a liquid, an outlet for the removal of a liquid, and a mixing means;

D. a clarifier containing an inlet for the introduction of a liquid, a first outlet for the removal of liquid, and a second outlet in its lower portion for removal of a liquid;

E. an ozonation reactor comprising:
  1. a first packed tower containing a first inlet for introducing liquid into the upper portion of said tower, a second inlet for introducing gas into the lower portion of said tower, a first outlet for removing a liquid from the lower portion of said tower, and a second outlet for removing a gaseous stream from the upper portion of said tower;

2. a second packed tower containing a first inlet in its upper portion for the introduction of a liquid material, a second inlet for introducing of a gaseous stream in its lower portion, a first outlet for removing liquid material adjacent the lower portion of said tower; and a second outlet for removing a gaseous stream from the upper portion of the tower;
3. said second packed tower being smaller than said first packed tower and containing packing having more surface area per unit volume than said first packed tower;
4. an ozone-generating means which contains an inlet for receiving a gaseous stream, and an outlet for removing ozone-containing gas; and
5. conduit means connecting:
 a. said second outlet of said first packed tower with the second inlet of said second packed tower;
 b. said outlet of said ozone-generating means to the second inlet of said first packed tower; and
 c. said second outlet of said second packed tower with the inlet of said ozone-generating means;

F. means connecting:
1. said outlet of said flotation and sedimentation tank to the first inlet of the mixing vessel;
2. the outlet of the mixing vessel to the inlet of the clarifier;
3. said first outlet of said clarifier to said inlet of said storage vessel; and
4. said outlet of said storage vessel to said first inlets of said first and second packed towers.

15. The apparatus of claim 14 wherein said mixing vessel comprises three mixing vessels connected in series.

16. The apparatus of claim 14 wherein said storage vessel comprises a first storage vessel connected to a much larger second storage vessel by conduit means near the lower portion of both vessels; and wherein both of the vessels are at the same level.

17. The apparatus of claim 14 wherein said storage vessel comprises a first storage vessel and a second storage vessel, said first and second storage vessels not being directly connected; and wherein the means connects:
1. the outlet of said flotation and sedimentation tank to the inlet of said first storage vessel;
2. said outlet of said first storage vessel to said first inlet of said mixing vessel;
3. said outlet of said mixing vessel to said inlet of said clarifier;
4. said first outlet of said clarifier to said inlet of said second storage vessel; and
5. said outlet of said second storage vessel to said first inlets of said first and second packed towers.

18. The apparatus of claim 14 which further includes a means for drying the gaseous stream from the overhead of the second packed tower subsequent to its removal from the second packed tower and prior to the ozone-generating means.

19. The apparatus of claim 14 which further includes a heat exchanger having an inlet and an outlet for the liquid material that is to be cooled, and conduit means connecting said outlet of said heat exchanger to the first inlet of said second packed tower.

20. Apparatus suitable for the purification of an aqueous waste stream from a silicone-polymer producing plant which comprises:
A. sedimentation and flotation tank containing an inlet for the introduction of a liquid, a first means in its upper portion for the removal of a liquid, a second means in its lower portion for the removal of solid, and an outlet interposed between said upper and lower portion for removing a liquid;
B. a storage vessel containing an inlet for the introduction of liquid, an outlet for the removal of liquid, and a mixing means;
C. a mixing vessel containing a first inlet for the introduction of a liquid, a second inlet for the introduction of a liquid, an outlet for the removal of a liquid, and a mixing means;
D. a clarifier containing an inlet for the introduction of a liquid, a first outlet for the removal of liquid, and a second outlet in its lower portion for removal of a liquid;
E. an ozonation reactor comprising:
1. a first packed tower containing a first inlet for introducing liquid into the upper portion of said tower, a second inlet for introducing gas into the lower portion of said tower, a first outlet for removing a liquid from the lower portion of said tower, and a second outlet for removing a gaseous stream from the upper portion of said tower;

2. a second packed tower containing a first inlet in its upper portion for the introduction of a liquid material, a second inlet for introducing of a gaseous stream in its lower portion, a first outlet for removing liquid material adjacent the lower portion of said tower; and a second outlet for removing a gaseous stream from the upper portion of the tower;
3. said second packed tower being smaller than said first packed tower and containing packing having more surface area per unit volume than said first packed tower;
4. an ozone-gnerating means which contains an inlet for receiving a gaseous stream, and an outlet for removing ozone-containing gas; and
5. conduit means connecting:
 a. said second outlet of said first packed tower with the second inlet of said second packed tower;
 b. said outlet of said ozone-generating means to the second inlet of said first packed tower; and
 c. said second outlet of said second packed tower with the inlet of said ozone-generating means;

F. means connecting:
1. said outlet of said flotation and sedimentation tank to the inlet of said storage vessel;
2. said outlet of said storage vessel to said first inlet of said mixing vessel;
3. the outlet of said mixing vessel to the inlet of said clarifier; and
4. said first outlet of said clarifier to said first inlets of said first and second packed towers.

* * * * *